United States Patent
Grant et al.

(10) Patent No.: US 7,992,772 B2
(45) Date of Patent: *Aug. 9, 2011

(54) METHOD AND SYSTEM FOR DETERRING PRODUCT COUNTERFEITING, DIVERSION AND PIRACY ON A SINGLE SYSTEM

(75) Inventors: Elliot Grant, Redwood City, CA (US); Warwick R. Stirling, Menlo Park, CA (US); Matthew Self, Emerald Hills, CA (US)

(73) Assignee: YottaMark, Inc., Redwood City, CA (US)

( * ) Notice: Subject to any disclaimer, the term of this patent is extended or adjusted under 35 U.S.C. 154(b) by 1238 days.

This patent is subject to a terminal disclaimer.

(21) Appl. No.: 11/612,191

(22) Filed: Dec. 18, 2006

(65) Prior Publication Data

US 2007/0170240 A1 Jul. 26, 2007

Related U.S. Application Data

(63) Continuation of application No. 11/347,424, filed on Feb. 2, 2006, now Pat. No. 7,614,546.

(60) Provisional application No. 60/650,364, filed on Feb. 3, 2005.

(51) Int. Cl.
*G06F 17/00* (2006.01)
(52) U.S. Cl. ...................................................... 235/375
(58) Field of Classification Search .......... 235/487–494, 235/375
See application file for complete search history.

(56) References Cited

U.S. PATENT DOCUMENTS

| 4,526,404 | A | 7/1985 | Vazquez |
| 4,544,590 | A | 10/1985 | Egan |
| 4,832,204 | A | 5/1989 | Handy et al. |
| 4,846,504 | A | 7/1989 | MacGregor et al. |
| 5,271,642 | A | 12/1993 | Jahier et al. |
| 5,343,529 | A | 8/1994 | Goldfine et al. |
| 5,360,628 | A | 11/1994 | Butland |
| 5,478,990 | A | 12/1995 | Montanari et al. |
| 5,486,686 | A | 1/1996 | Zydbel, Jr. et al. |
| 5,569,317 | A | 10/1996 | Sarada et al. |
| 5,592,561 | A | 1/1997 | Moore |
| 5,611,948 | A | 3/1997 | Hawkins |

(Continued)

FOREIGN PATENT DOCUMENTS

CN 1350265 A 5/2002

(Continued)

OTHER PUBLICATIONS

U.S. Appl. No. 12/143,016, Elliott Grant, Duo Codes for Product Authentication, filed Jun. 20, 2008.

(Continued)

*Primary Examiner* — Jamara Franklin
(74) *Attorney, Agent, or Firm* — Peters Verny, LLP

(57) ABSTRACT

A method and system for authenticating goods and thereby detecting and deterring counterfeits are disclosed. According to one aspect of the invention, a client utilizes data received from a host to generate a plurality of security codes and to direct a printing device to print the plurality of security codes on a plurality of products, without retaining the plurality of security codes after the printing device has printed the plurality of security codes on the plurality of products. After the security codes have been printed, a person can communicate the security code to the host, which can verify its authenticity.

6 Claims, 7 Drawing Sheets

U.S. PATENT DOCUMENTS

| | | | |
|---|---|---|---|
| 5,619,416 | A | 4/1997 | Kosarew |
| 5,768,384 | A | 6/1998 | Berson |
| 5,895,073 | A | 4/1999 | Moore |
| 5,917,925 | A | 6/1999 | Moore |
| 6,005,960 | A | 12/1999 | Moore |
| 6,041,929 | A | 3/2000 | Brunner et al. |
| 6,203,069 | B1 | 3/2001 | Outwater et al. |
| 6,211,789 | B1 | 4/2001 | Oldham et al. |
| 6,212,638 | B1 | 4/2001 | Lee et al. |
| 6,226,619 | B1 | 5/2001 | Halperin et al. |
| 6,231,435 | B1 | 5/2001 | Pilger |
| 6,246,778 | B1 | 6/2001 | Moore |
| 6,297,508 | B1 | 10/2001 | Barmore et al. |
| 6,308,165 | B1* | 10/2001 | Gilham ............................. 705/62 |
| 6,329,920 | B1 | 12/2001 | Morrison et al. |
| 6,342,839 | B1 | 1/2002 | Curkendall et al. |
| 6,346,885 | B1 | 2/2002 | Curkendall |
| 6,349,292 | B1* | 2/2002 | Sutherland et al. ............. 705/62 |
| 6,361,079 | B1 | 3/2002 | Kirkman |
| 6,363,483 | B1* | 3/2002 | Keshav .......................... 713/176 |
| 6,364,990 | B1 | 4/2002 | Grosskopf et al. |
| 6,398,106 | B1 | 6/2002 | Ulvr et al. |
| 6,409,082 | B1 | 6/2002 | Davis et al. |
| 6,428,640 | B1 | 8/2002 | Stevens et al. |
| 6,442,276 | B1 | 8/2002 | Doljack |
| 6,456,729 | B1 | 9/2002 | Moore |
| 6,536,672 | B1 | 3/2003 | Outwater |
| 6,547,137 | B1 | 4/2003 | Begelfer et al. |
| 6,591,252 | B1* | 7/2003 | Young ............................. 705/67 |
| 6,612,494 | B1 | 9/2003 | Outwater |
| 6,664,897 | B2 | 12/2003 | Pape et al. |
| 6,680,783 | B1 | 1/2004 | Pierce et al. |
| 6,766,324 | B2 | 7/2004 | Carlson et al. |
| 6,788,800 | B1 | 9/2004 | Carr et al. |
| 6,796,504 | B2 | 9/2004 | Robinson |
| 6,805,926 | B2 | 10/2004 | Cote et al. |
| 6,806,478 | B1 | 10/2004 | Hatfield |
| 6,808,574 | B1 | 10/2004 | Stevens et al. |
| 6,859,672 | B2 | 2/2005 | Roberts et al. |
| 6,991,261 | B2 | 1/2006 | Dronzek, Jr. et al. |
| 6,995,675 | B2 | 2/2006 | Curkendall et al. |
| 7,013,286 | B1 | 3/2006 | Aggarwal et al. |
| 7,040,532 | B1 | 5/2006 | Taylor et al. |
| 7,137,000 | B2* | 11/2006 | Hohberger et al. ........... 713/168 |
| 7,207,481 | B2 | 4/2007 | Barenburg et al. |
| 7,211,163 | B2 | 5/2007 | Kennedy |
| 7,222,791 | B2 | 5/2007 | Heilper et al. |
| 7,261,235 | B2 | 8/2007 | Barenburg et al. |
| 7,277,601 | B2 | 10/2007 | Zorab et al. |
| 7,283,630 | B1 | 10/2007 | Doljack |
| 7,295,114 | B1 | 11/2007 | Drzaic et al. |
| 7,321,310 | B2 | 1/2008 | Curkendall et al. |
| 7,412,461 | B2 | 8/2008 | Sholl et al. |
| 7,519,825 | B2 | 4/2009 | Geoffrey |
| 7,686,513 | B2 | 3/2010 | Knoerzer et al. |
| 7,705,735 | B2 | 4/2010 | Pape et al. |
| 7,714,729 | B2 | 5/2010 | Pape et al. |
| 7,827,058 | B2 | 11/2010 | Mortimer |
| 2001/0056359 | A1* | 12/2001 | Abreu |
| 2002/0004767 | A1* | 1/2002 | Okamoto et al. |
| 2002/0158765 | A1 | 10/2002 | Pape et al. |
| 2002/0178363 | A1 | 11/2002 | Ambrogio et al. |
| 2003/0080191 | A1 | 5/2003 | Lubow et al. |
| 2003/0177025 | A1 | 9/2003 | Curkendall et al. |
| 2003/0177095 | A1* | 9/2003 | Zorab et al. |
| 2003/0221108 | A1 | 11/2003 | Rupp |
| 2004/0200892 | A1 | 10/2004 | Curkendall et al. |
| 2004/0205343 | A1 | 10/2004 | Forth et al. |
| 2005/0004682 | A1 | 1/2005 | Gaddis et al. |
| 2005/0097054 | A1* | 5/2005 | Dillon |
| 2005/0108044 | A1 | 5/2005 | Koster |
| 2005/0247778 | A1* | 11/2005 | Roberts |
| 2005/0251449 | A1 | 11/2005 | Pape et al. |
| 2006/0004907 | A1 | 1/2006 | Pape et al. |
| 2006/0054682 | A1* | 3/2006 | de la Huerga et al. |
| 2006/0100964 | A1* | 5/2006 | Wilde et al. |
| 2006/0111845 | A1 | 5/2006 | Forbis et al. |
| 2006/0161443 | A1 | 7/2006 | Rollins |
| 2006/0180661 | A1 | 8/2006 | Grant et al. |
| 2006/0187048 | A1 | 8/2006 | Curkendall et al. |
| 2007/0051362 | A1* | 3/2007 | Sullivan et al. |
| 2007/0119954 | A1 | 5/2007 | Barenburg et al. |
| 2007/0119955 | A1 | 5/2007 | Barenburg et al. |
| 2007/0205258 | A1* | 6/2007 | Self et al. |
| 2007/0170240 | A1 | 7/2007 | Grant et al. |
| 2007/0175974 | A1 | 8/2007 | Self et al. |
| 2007/0203724 | A1 | 8/2007 | Farmer et al. |
| 2007/0203818 | A1 | 8/2007 | Farmer et al. |
| 2008/0011841 | A1 | 1/2008 | Self et al. |
| 2008/0011843 | A1 | 1/2008 | Barenburg et al. |
| 2008/0030348 | A1 | 2/2008 | Pape et al. |
| 2008/0046263 | A1* | 2/2008 | Sager et al. |
| 2008/0143094 | A1 | 6/2008 | Goetz |
| 2008/0178197 | A1 | 7/2008 | Pape et al. |
| 2008/0215484 | A1 | 9/2008 | Oldham et al. |
| 2009/0242631 | A1 | 10/2009 | Wishnatzki et al. |
| 2010/0106660 | A1 | 4/2010 | Farmer et al. |

FOREIGN PATENT DOCUMENTS

| | | |
|---|---|---|
| WO | 03007252 A1 | 1/2003 |
| WO | 2006084090 A2 | 8/2006 |

OTHER PUBLICATIONS

U.S. Appl. No. 12/143,085, Elliott Grant, Duo Codes for Product Authentication, filed Jun. 20, 2008.
PCT/US08/75626 International Search Report and Written Opinion, Nov. 26, 2008.
Secure Symbology, Inc. Business Overview, May, 2008.
Paul Chang, IBM Industry Forum 2010, Mexico Industry Event, 2010.
PCT/US06/03768 International Search Report and Written Opinion, Jun.12, 2008.
Chinese patent application 200680003972.X Office Action, Jun. 8, 2010.
Chinese patent application 200680003972.X Applicant's response, Oct. 14, 2010.
Chinese patent application 201010233514.3 Office Action, Apr. 2, 2011.
U.S. Appl. No. 11/347,424 Office action, Jun. 3, 2008.
U.S. Appl. No. 11/347,424 Applicants' Amendment A, Aug. 6, 2008.
U.S. Appl. No. 11/347,424 Office action, Dec. 26, 2008.
U.S. Appl. No. 11/347,424 Office action, May 1, 2009.
U.S. Appl. No. 11/347,424 Applicants' Amendment B, May 14, 2009.
U.S. Appl. No. 11/347,424 Applicants' Interview Summary, Jul. 1, 2009.
U.S. Appl. No. 11/612,209 Office action, Dec. 7, 2009.
U.S. Appl. No. 11/612,209 Applicants' Amendment A, Jan. 22, 2010.
U.S. Appl. No. 11/619,747 Office action, Nov. 9, 2009.
U.S. Appl. No. 11/619,747 Applicants' Amendment A, Jan. 14, 2010.
U.S. Appl. No. 11/619,747 Final Rejection, Apr. 14, 2010.
U.S. Appl. No. 11/619,747 Applicants' Amendment B, Apr. 15, 2010.
U.S. Appl. No. 11/743,648 Office action, Aug. 17, 2010.
U.S. Appl. No. 11/743,652 Office action, May 25, 2010.
U.S. Appl. No. 11/770,567 Office action, Oct. 7, 2010.

* cited by examiner

130  4TNM VG71　ZN07 L8QZ

132

METHOD AND SYSTEM FOR DETERRING PRODUCT COUNTERFEITING, DIVERSION AND PIRACY ON A SINGLE SYSTEM

RELATED APPLICATIONS

Under 35 U.S.C §120, this application is a continuation of U.S. patent application Ser. No. 11/347,424, filed Feb. 2, 2006, now U.S. Pat. No. 7,615,546 which claims the benefit of U.S. Provisional Application No. 60/650,364, filed Feb. 3, 2005, all of which is incorporated herein by reference.

TECHNICAL FIELD

The present invention relates generally to anti-counterfeiting measures, and in particular, to a method and system for authenticating products, and thereby deterring counterfeiting diversion and/or piracy.

BACKGROUND

In the consumer goods industry, counterfeiting is a significant and growing problem. While fashion and luxury goods have long been targets of counterfeiters, nearly any branded product can be the subject of counterfeiting. For example, products such as shampoo, automotive parts, baby formula and even beer have been the subjects of counterfeiting. Counterfeiting is difficult to detect, investigate, and quantify. Consequently, it is difficult to know the full extent of the problem. However, by some estimates, between five to seven percent of all world trade is in counterfeit goods, amounting to an annual value that exceeds $250 billion. That figure is likely to increase as globalization continues and supply chains are extended further into developing countries that lack the ability and/or the desire to detect and prevent counterfeiting.

In a traditional counterfeiting scheme, an individual or group of individuals, produces, packages and attempts to sell products with the intent to deceptively represent the product's authenticity and/or source. In most cases, the quality of a counterfeit is less than the original product that the counterfeit has been designed to emulate. Consequently, consumers that unknowingly purchase counterfeit goods are being defrauded. In some cases, such as with drugs, medicines and automotive parts, when a consumer unknowingly purchases a counterfeit, the results can be dire.

Counterfeiting has a significant impact on business entities as well. Perhaps the most obvious negative effect counterfeits have on companies is lost revenue and profit. Less obvious but equally important is the potential damage counterfeits can cause to a company's brand equity. For example, a single highly publicized negative incident caused by the use of a counterfeit can cause immeasurable damage to a company's reputation.

Several techniques have been developed or proposed for preventing counterfeiting. For example, some of the techniques aimed at preventing counterfeiting include marking products, labels or product packaging with an identifying mark using holograms, color shifting inks, tamper labels, intaglio inks, and ultraviolet inks. However, this approach is often ineffective because the identifying mark is easily copied by counterfeiters, and/or is too difficult for consumers to recognize.

Another approach to preventing counterfeiting is to utilize radio frequency identification (RFID) tags. For example, by attaching a special RFID tag to a product when it is initially packaged, the product can be later authenticated by verifying the unique identifying data transmitted by the RFID tag. However, adding an RFID tag to each product increases the overall cost of the product. Moreover, the equipment (e.g., RFID sensors or readers) needed to verify the RFID tag may only be available to certain entities in the distribution chain of the product, and almost certainly are not available to a consumer of the product. The RFID tags themselves or the codes within them are also subject to counterfeiting. Consequently, there remains a need for an effective and economical anti-counterfeiting system.

SUMMARY OF THE DESCRIPTION

A method and system for detecting and deterring counterfeits are provided. Consistent with one embodiment of the invention, a system for deterring counterfeits includes a client and a host. The client includes code generation logic that utilizes data received from the host to generate a batch of security codes. Once the security codes are generated, the client directs a printing device to print the batch of security codes on a batch of products without retaining security codes after the printing device has printed the security codes on the products. The host includes code authentication logic that receives a security code that has been printed on a particular product along with a code authentication request. Accordingly, the host authenticates the security code by determining whether the security code was generated by the client.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
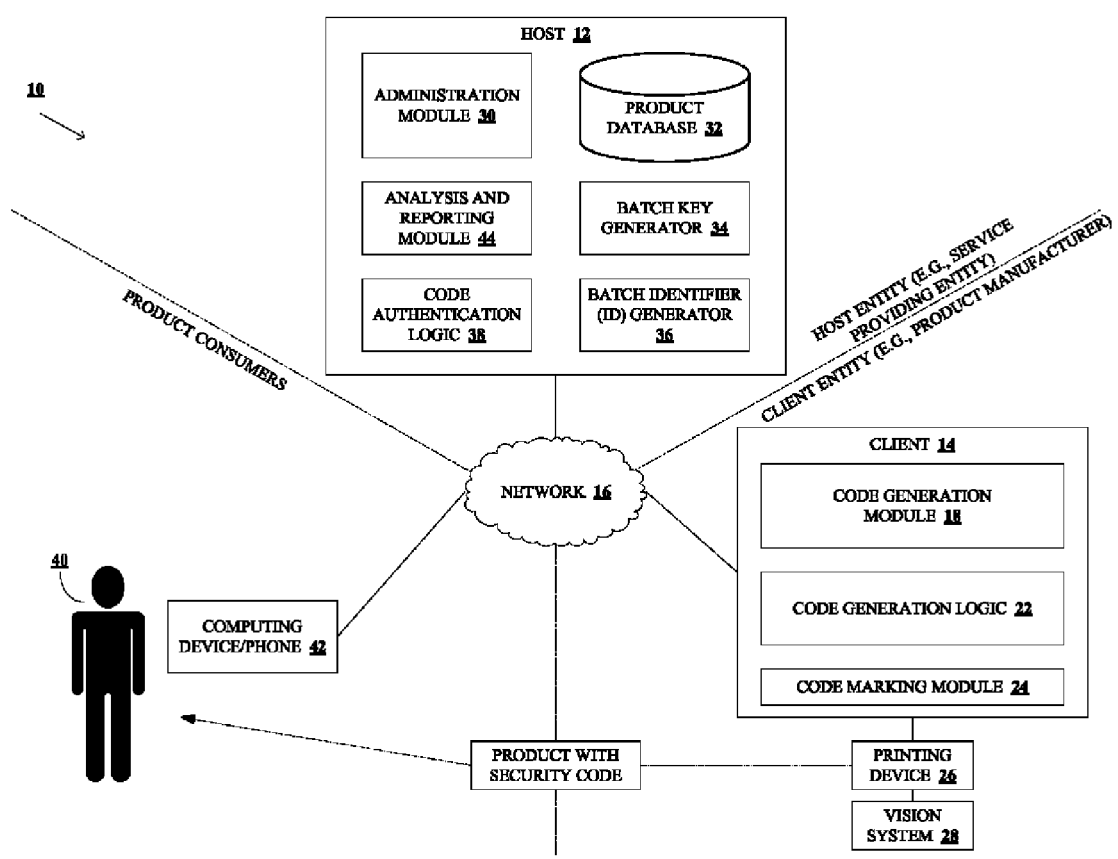
FIG. 1 illustrates an anti-counterfeiting system having a host component and a client component, consistent with one embodiment of the present invention.

Methods and systems for detecting and deterring counterfeits are described. In the following description, for purposes of explanation, numerous specific details are set forth in order to provide a thorough understanding of the present invention. It will be evident to one skilled in the art, however, that the present invention may be practiced without these specific details. The description and representation herein are the means used by those experienced or skilled in the art to effectively convey the substance of their work to others skilled in the art. In some instances, to avoid unnecessarily obscuring aspects of the present invention, well known operations and components have not been described in detail.

Reference herein to "one embodiment" or "an embodiment" means that a particular feature, structure, operation, or other characteristic described in connection with the embodiment may be included in at least one implementation of the invention. However, the appearance of the phrase "in one embodiment" in various places in the specification does not necessarily refer to the same embodiment.

Embodiments of the present invention include methods and systems for authenticating original products, and thereby detecting and deterring product counterfeits. In one embodiment of the invention, a system for detecting counterfeits includes a host component and a client component. Accordingly, the client generates a plurality of security codes utilizing data received from the host, and then directs a printing device to print the security codes on consumer products. However, in contrast to previously known anti-counterfeiting systems, after the security codes have been printed on the products, the security codes are not retained. That is, neither the host nor the client retains the security codes in short- or long-term memory, after the security codes have been printed and the products have been placed in the stream of commerce. Furthermore, in one embodiment of the invention, the security codes are generated at the location where they are printed on products. Consequently, the security codes need not be communicated over a network, where they may be compromised, for example, by a network packet sniffing application.

As will be described in greater detail below, a product consumer or any other person in the product distribution chain can verify the authenticity of a product on which a security code has been printed by simply communicating the security code to the host. Furthermore, a wide variety of devices and methods may be utilized to communicate a security code to the host for authentication. For example, a telephone may be utilized to communicate a security code to the host by speaking the security code, or alternatively, by inputting the security code using the telephone's touch-tone dial pad. Alternatively, a computing device (e.g., personal computer, personal digital assistant, mobile phone, etc.) may be used to communicate a security code to the host. For example, a security code may be captured with a keyboard, telephone key pad, camera, or barcode reader and then sent to the host. After the security code has been received and authenticated at the host, the host communicates a result of the authentication operation to the consumer.

It will be appreciated by those skilled in the art that the present invention is particularly applicable to branded products and goods. A branded product may include any product that has an identifiable source (e.g., manufacturer or provider). Often, but certainly not always, a branded product is marked with a proprietary name or feature, such as a trademark. In some cases, a product brand may be recognizable by the design, shape or color of a product or good. A branded product may include, but is by no means limited to: pharmaceuticals, cosmetics, toiletries, hair care products, nutraceuticals, toys, tobacco, food, beverages, automotive parts, apparel and footwear, computer hardware and software, electronics, household goods, cleaning products, eyewear, and luxury items.

FIG. 1 illustrates an anti-counterfeiting system 10, according to one embodiment of the invention, having a host component 12 and a client component 14. In one embodiment of the invention, the host 12 may be maintained and operated by an entity that provides anti-counterfeiting services to one or more product manufacturers. Accordingly, the host 12 may be connected by means of a network 16 to any number of clients 14. For example, a product manufacturer with several product packaging facilities may employ several clients 14, with one client 14 at each individual packaging facility. Similarly, the host 12 may service a variety of clients 14 associated with different product manufacturers.

The network 16, over which the host 12 and the client 14 communicate, may be an open network, such as the Internet, or a private network. In one embodiment of the invention, communications between the host 12 and the client 14 are achieved by means of a secure communications protocol, for example, such as secure sockets layer (SSL) or transport layer security (TLS).

Referring again to FIG. 1, the client 14 includes a code generation module 18, code generation logic 22 and a code marking module 24. The code generation module 18 facilitates interaction between the client 14 and users of the client 14 (e.g., client-users).

In one embodiment of the invention, a client-user may initiate the generation of a batch of security codes by entering a number indicating the size of the batch of security codes required. In addition, the code generation module 18 may prompt the client-user to enter product data associated with a product on which the security codes are to be printed. For example, the code generation module 18 may prompt the client-user to enter product data, such as a universal product code (UPC), a product description, a package size or quantity, a packaging image, or some time- or location-specific attributes such as a work order, lot number, manufacturing date, use-by date, operator name, or manufacturing plant. The product data entered into the code generation module 18 may be communicated to the host 12 along with a request to generate security codes.

During the authentication operation, which is described in greater detail below in connection with the description of FIG. 5, the product data, or a subset of the product data, entered by the client-user or stored on the host may be displayed or otherwise communicated to a consumer or other person in the supply chain in response to a code authentication request. Moreover, the particular product data that is displayed or communicated may vary depending on the person submitting the code authentication request. In particular, the product data displayed or communicated may vary depending on the position of the person in the overall supply chain or stream of commerce. For example, a customs official that submits a code authentication request may be presented with different product data than a consumer.

As described in greater detail below, in connection with the description of FIG. 4, the code generation logic 22 utilizes data received from the host 12 to generate the security codes that are printed on the products. In one embodiment of the invention, the code marking module 24 controls the transfer of security codes to the printing device 26, which may print the security codes directly on the products, or alternatively, on a product label or product packaging. Accordingly, the code marking module 24 may confirm that security codes are transferred correctly from the host 12 to the printing device 26. In addition, the code marking module 24 may keep a running tally of the number of security codes that have been transferred from the client 14 to the printing device 26, and/or the number of security codes that have been printed.

The printing device 26 may be any type of printing system suitable for printing security codes on products, labels or product packaging. For example, the printing device 26 may include a high-speed industrial inkjet printer (with visible or invisible ink), a thermal transfer printer (with visible or invisible dye ribbons), a laser marker or other industrial marking system. In certain embodiments, special invisible inks, or other related technologies may be utilized to covertly mark products with invisible security codes. The printing device 26 may consist of any combination of these printing technologies. It will be appreciated by those skilled in the art that the printing device specifications will be based on the customer's performance requirements, packaging or product substrate material, and operating environment, and will generally reflect the state of the art in such printing or marking systems.

In one embodiment of the invention, the security codes may be printed on a tamper-evident seal. Accordingly, the tamper-evident seal may be positioned on the product in such a way that the tamper-evident seal is destroyed when the product is opened, or otherwise used. Consequently, once destroyed, the security codes cannot be reused.

In one embodiment of the invention, the printing device 26 may be connected to, or integrated with, a vision system 28 or other imaging device. The vision system 28 may scan or read each security code as it is printed to detect whether a printing problem has occurred and to ensure an overall level of print quality is met. Accordingly, upon detecting an error in the printing of a particular security code, the vision system 28 may flag the security code by notifying the client 14 or host 12, or otherwise rejecting the low quality printed security code. The vision system 28 may be implemented through use of "machine-vision", such as an optical or non-contact reader, which has the ability to detect physical attributes of the security codes as they are printed on the product, label or product packaging. The vision system 28, in conjunction with other process control methods, ensures that only high quality security codes are printed on products or packages, while keeping the reject rate extremely low to maintain yield and throughput on a filling or packaging line.

As illustrated in FIG. 1, the printing device 26 and vision system 28 are separate from the client 14. It will be appreciated by those skilled in the art that in an alternative embodiment, the printing device 26 may be integrated with the client 14. Similarly, the code marking module 24 is shown integrated with the client 14 in FIG. 1. It will be appreciated by those skilled in the art that in an alternative embodiment, the code marking module 24 may be integrated with the printing device 26. In one embodiment of the invention, the client 14 may be implemented in a distributed manner, such that one or more client components are geographically separated. For example, in one embodiment of the invention, the code generation module 18 may be located in a business headquarters, while one or more of the other components, including the printing device, are located at a packaging facility. In a distributed embodiment, one code generation module 18 may be integrated to support and work with multiple code marking modules 24 and/or printing devices 26. Accordingly, a distributed embodiment may be implemented when a manufacturer has multiple packaging facilities.

The host 12 of the anti-counterfeiting system 10 includes an administration module 30. Similar to the code generation module 18 of the client 14, the administrative module 30 facilitates interaction between the host 12 and a host-user.

The host 12 includes a batch identifier (batch ID) generator 36 and a batch key generator 34. As described in greater detail below, in response to receiving a client request to generate security codes, the batch ID generator 36 generates a batch ID for the set of security codes and the batch key generator 34 generates an associated batch key (also referred to as a seed number). The batch ID and batch key are associated with the client request and stored by the host 12, for example, in the product database 32, along with product data received with the client request. In addition, the host 12 communicates the batch ID and batch key to the client 14, which utilizes batch ID and batch key to generate unique security codes that are printed on products.

The host 12 also includes code authentication logic 38. As described in greater detail below in connection with the description of FIG. 5, the code authentication logic 38 receives and authenticates security codes that have been printed on products. For example, after a security code has been printed on a product, a consumer or other person in the supply chain or stream of commerce can communicate the security code to the host 12 for authentication purposes. If the host 12 determines the security code is authentic, the host 12 may report such to the consumer.

Consistent with an embodiment of the invention, various methods and devices may be utilized to communicate a security code to the host 12 for authentication purposes. For example, in one embodiment, a consumer 40 may utilize a phone-based service (e.g., voice, short messaging system (SMS), web-enabled application), a personal computer, a personal digital assistant, a camera-phone, or other computing device 42 with data communications, to communicate a code authentication request (including the security code) to the host 12. After the security code has been communicated to the host 12, the code authentication logic 38 will validate the authenticity of the security code. In one embodiment of the invention, the host 12 may reply to the code authentication request with a message including key attributes associated with the product. For example, the response from the host 12 may include a description of the particular product, including the brand name, size or quantity, expiration date, date of manufacture, place of manufacture, lot number, or any other potentially relevant data.

In one embodiment of the invention, the host 12 includes an analysis and reporting module 44. The analysis and reporting module 44 has two primary functions. First, the analysis component provides a mechanism for identifying potential fraudulent activity by tracking and analyzing code authentication requests. For example, the analysis component records each time a request is received to authenticate a particular security code, and when possible, the source (e.g., person, geographical location, or other device identifier, such as an Internet Protocol address) from which each request is received. Accordingly, by analyzing security codes received with code authentication requests, the analysis component is able to detect suspicious patterns that may indicate counterfeiting activity. For example, if an authentic security code is copied and utilized on a batch of counterfeits, then it is likely that several consumers may attempt to authenticate the same security code (e.g., the copied security code). By detecting suspicious patterns, the analysis and reporting tool 44 can notify a manufacturer's brand security personnel to monitor the activities in a particular point of the supply chain.

The other primary function of the analysis and reporting module 44 is a reporting function. In one embodiment of the invention, the reporting component of the module 44 provides a mechanism for reporting suspicious activities, as well as general business reports. The reports may present a range of relevant information designed to give insight into fraudulent or suspicious activities in the supply chain and so allow brand security personnel to take rapid preventative action. In addition, the reporting component may generate business reports that include formatted data associated with authentication activities for different products. Reporting functions may be customized through the client, the host, or both. In one embodiment, reporting rules and alerts may be established for the analysis and reporting module 44 that automatically alert brand security personnel if a counterfeit alert has been triggered, for example by detecting a pattern of code authentication requests indicating a high likelihood that a security code has been copied or cloned.

It will be appreciated by one skilled in the art that the anti-counterfeiting system 10 illustrated in FIG. 1 has been provided as one example or embodiment of the invention, and is not meant to be limiting in nature. The system may include other logic and functional or modular components, the description of which has not been provided to avoid unnecessarily obscuring the invention.

Figure 2:
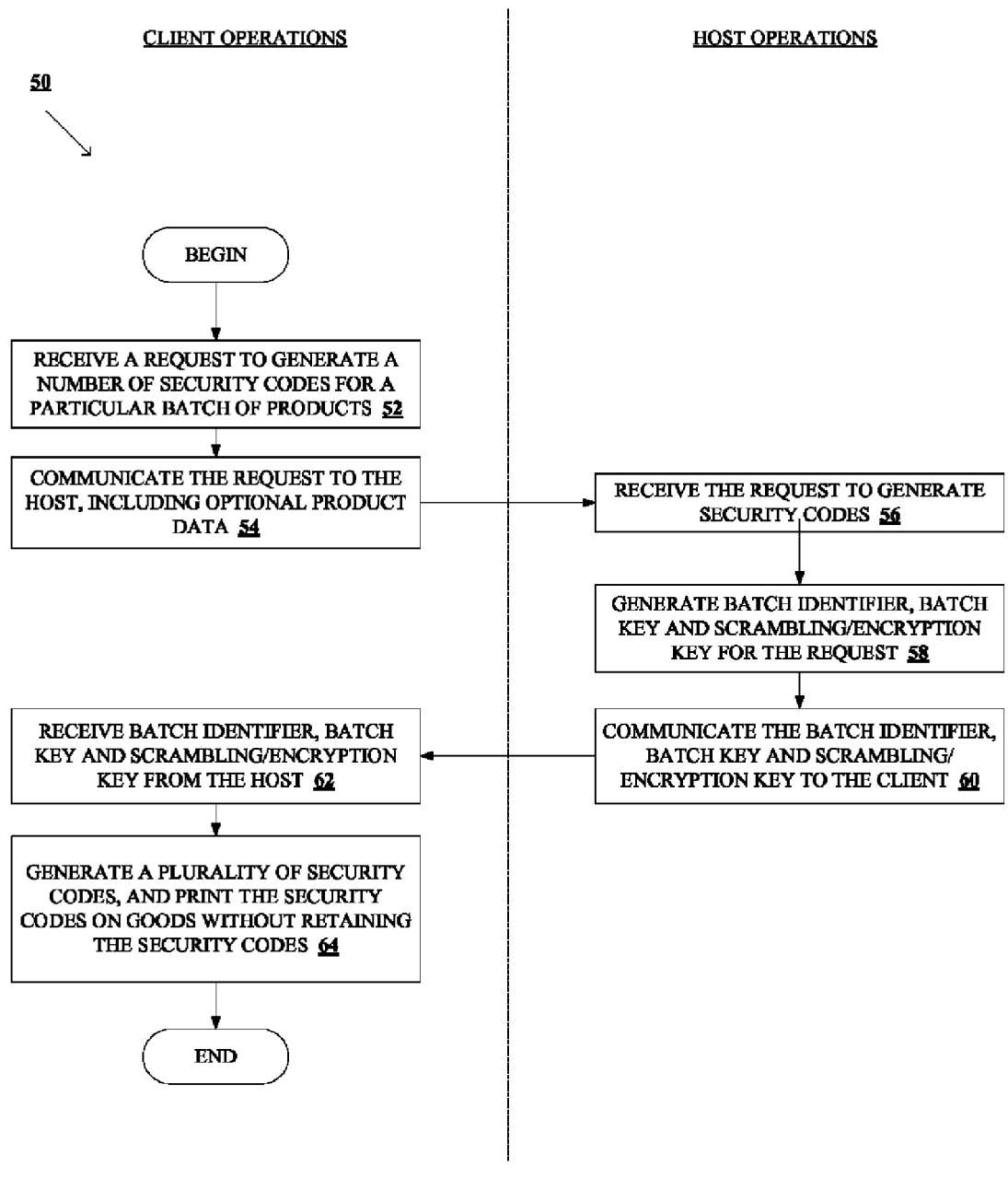
FIG. 2 illustrates a method, according to one embodiment of the invention, for generating a plurality of unique security codes to be printed on products.

FIG. 2 illustrates a method 50, according to one embodiment of the invention, for generating a plurality of unique security codes to be printed on products. As illustrated in FIG. 2, the operations associated with the method 50 that are performed at, or by, the client 14 are separated (i.e., to the left of the dotted line 51) from those operations that are performed at, or by, the host 12. At operation 52, the client 14 receives a user-initiated request to generate a number of security codes for a particular product. For example, the user-initiated request may be received via the code generation module 18 of the client 14. Additionally, the user-initiated request may include data associated with a product on which the security codes are to be printed, as well as a number indicating the quantity of security codes to be generated and printed.

After receiving the user-initiated request, the client 14 formulates a client request and communicates the client request to the host 12 at operation 54. For example, in one embodiment of the invention, the client 14 may extract a portion of the product data entered by the client-user, and include the extracted product data in the client request along with the number entered by the user that indicates the quantity of security codes to be generated and printed. The client 14 then communicates the client request (e.g., over the network 16) to the host 12. In one embodiment of the invention, communications between the client 14 and host 12 are encrypted, or otherwise secured.

At operation 56, the host 12 receives the client request. In response to receiving the client request, at operation 58, the host 12 generates a batch identifier and batch key (or seed number). The batch ID may be generated in any way that assures the batch ID is distinct from all previously-used batch IDs, such as a simple numerical progression, a deterministic pseudo-random sequence, or a series of randomly generated values from which duplicates are removed. The batch keys can be generated by a pseudo-random sequence, a hardware random number generator, or any method that generates keys that are difficult to predict. It will be appreciated by one skilled in the art that in order to assure the integrity of the security codes it is important that the batch keys are generated in a way that cannot be predicted by an individual or system attempting to generate counterfeit codes. The batch keys should also be unique to prevent duplicate security codes from being generated by the client 14. The batch ID and batch key are stored along with the product data received from the client 14 in the host's 12 product database 32. Then, after generating the batch ID and batch key, at operation 60, the host 12 communicates the batch ID and batch key to the client 14.

In one embodiment of the invention, an optional encryption key 94 (also known as a scrambling ID), may be communicated from the host 12 to the client 14 along with the batch ID and batch key. As described in greater detail below, the encryption key 94 indicates a particular scrambling or encryption method that is to be utilized by the client 14 during the generation of the security codes, and by the host 12 during authentication of a security code. Alternatively, rather than passing the encryption key 94 from the host 12 to the client 14, the host 12 and client 14 may be configured to utilize a predetermined scrambling or encryption method.

Upon receiving, at operation 62, the batch ID and batch key from the host 12, the client 14 utilizes the batch ID and batch key to generate a plurality of security codes at operation 64. In addition, at operation 64, the client 14 directs a printing device 26 to print the security codes on products, without retaining the security codes in a security code repository (e.g., a database or recording medium). Consequently, after the client 14 has directed the printing device 26 to print the security codes on the individual products, neither the client 14 nor the host 12 retains the security codes. That is, the security codes are not retained in memory and are not written to disk storage. Neither do the security codes need to be transmitted to the host 12. This prevents the security codes from being compromised if an unauthorized person gains access to the client 14 or the host 12. Moreover, as the security codes are generated at the printing location, there is no risk that the security codes will be compromised in transit (e.g., over a network) to the printing location. The client 14 does not retain the batch key after the security codes have been printed, so no additional security codes can be produced without making a new request from the client 14 to the host 12.

After printing of all security codes for the batch is complete, the client 14 optionally communicates to the host 12 the actual number of security codes that were printed, which may be less than the number originally requested if code generation or printing are interrupted or if the number of products to be produced is less than anticipated.

Figure 3:
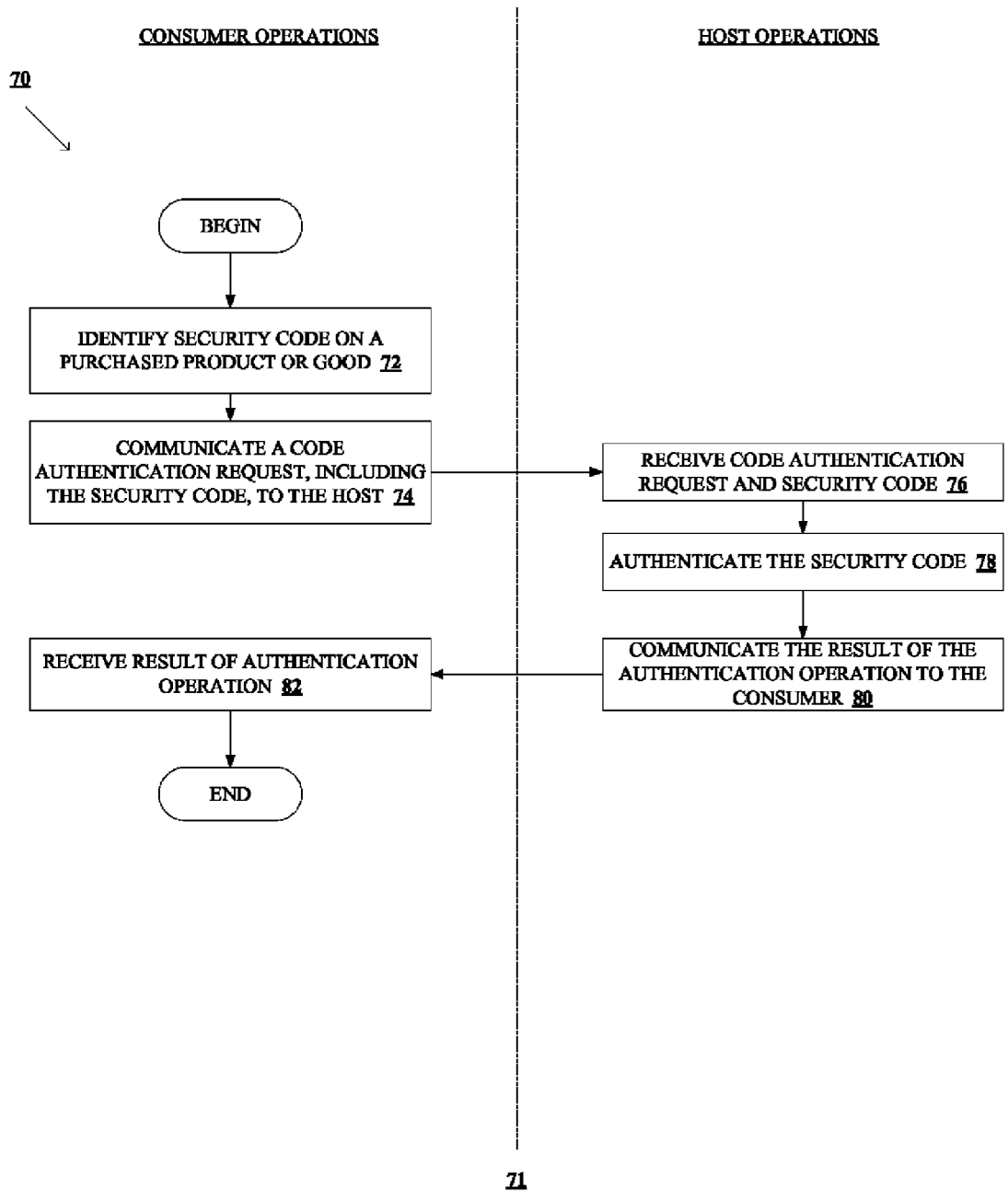
FIG. 3 illustrates a method, according to an embodiment of the invention, for authenticating a product on which a security code has been printed.

FIG. 3 illustrates a method 70, according to an embodiment of the invention, for authenticating a product on which a security code has been printed. As illustrated in FIG. 3 the operations associated with the method 70 that are performed at, or by, the host 12 are separated (i.e., to the right of the dotted line 71) from those operations that are performed by a consumer or other person in a product supply or product distribution chain. In one embodiment of the invention, the method 70 for authenticating a product begins at operation 72, when a consumer identifies the security code on the packaging of the product in question.

Next, at operation 74, the consumer communicates a code authentication request, including the security code, to the host 12. In various embodiments of the invention, operation 74 may be achieved in one of several ways. If the security code is provided as alphanumeric text on the product, label or product packaging, then the consumer may communicate the security code to the host's code authentication logic 38 utilizing any communication device that enables the consumer to enter the alphanumeric text. For example, a consumer may use a Web-based application executing on a computing device, such as a personal computer, personal digital assistant (PDA), mobile phone, or any other similar device, to communicate the security code over a network to the host 12. In one embodiment of the invention, the host's 12 code authentication logic 38 may include a speech recognition module, computer telephony application, or integrated voice response unit (not shown). Accordingly, a consumer may speak the alphanumeric security code into a telephone to communicate the security code to the host 12. In certain embodiments of the invention, the security code may be alphanumeric text that has been encoded as a graphic symbol, such as a datamatrix, or other barcode. In such a case, the consumer may utilize a device with an image reading or image capturing mechanism to communicate the security code to the host 12. For example, a camera or scanner may be used to capture an image of the security code (e.g., graphic symbol), which is then communicated to the host. In certain embodiments of the invention, the graphic symbol may be decoded, resulting in alphanumeric text, prior to being communicated to the host 12. Alternatively, in certain embodiments of the invention, the host's 12 code authentication logic 38 may include a decoding component that is able to decode scanned images of the graphic symbol into alphanumeric text.

Referring again to the method 70 illustrated in FIG. 3, at operation 76, the host 12 receives the code authentication request and the security code. At operation 78, the host 12 authenticates the security code. An example of an authentication operation is provided in the description below with reference to FIG. 5. It will be appreciated by those skilled in the art, that the authentication operation may vary depending upon the particular implementation. However, consistent with the invention, neither the host nor the client store the security code after it has been printed on the product. Consequently, the code authentication logic 38 is able to authenticate the security code without accessing a copy of the security code stored in a repository or database.

After the security code has been authenticated by the host's 12 code authentication logic 38, at operation 80, the host 12 may communicate the result of the authentication operation to the consumer. In one embodiment of the invention, the result of the authentication operation will be communicated in the same manner as the code authentication request and security code were received from the consumer. For example, if the request was received via a telephone call, then an automated computer telephony application may communicate the result of the operation to the consumer via the telephone. Alternatively, in one embodiment of the invention, a different means of communication may be used to communicate the result of the authentication operation than was used to receive the security code. In any case, at operation 82, the consumer receives the result of the authentication operation.

It will be appreciated by those skilled in the art that, in the foregoing examples, operations attributed to a consumer may actually be carried out by a computing device. For example, a result of the authentication process is communicated to a consumer by means of some computing device or telephone. In addition, it will be appreciated by those skilled in the art that the functional components, modules, and logic described herein may be implemented in hardware, software, or any combination thereof.

Figure 4:
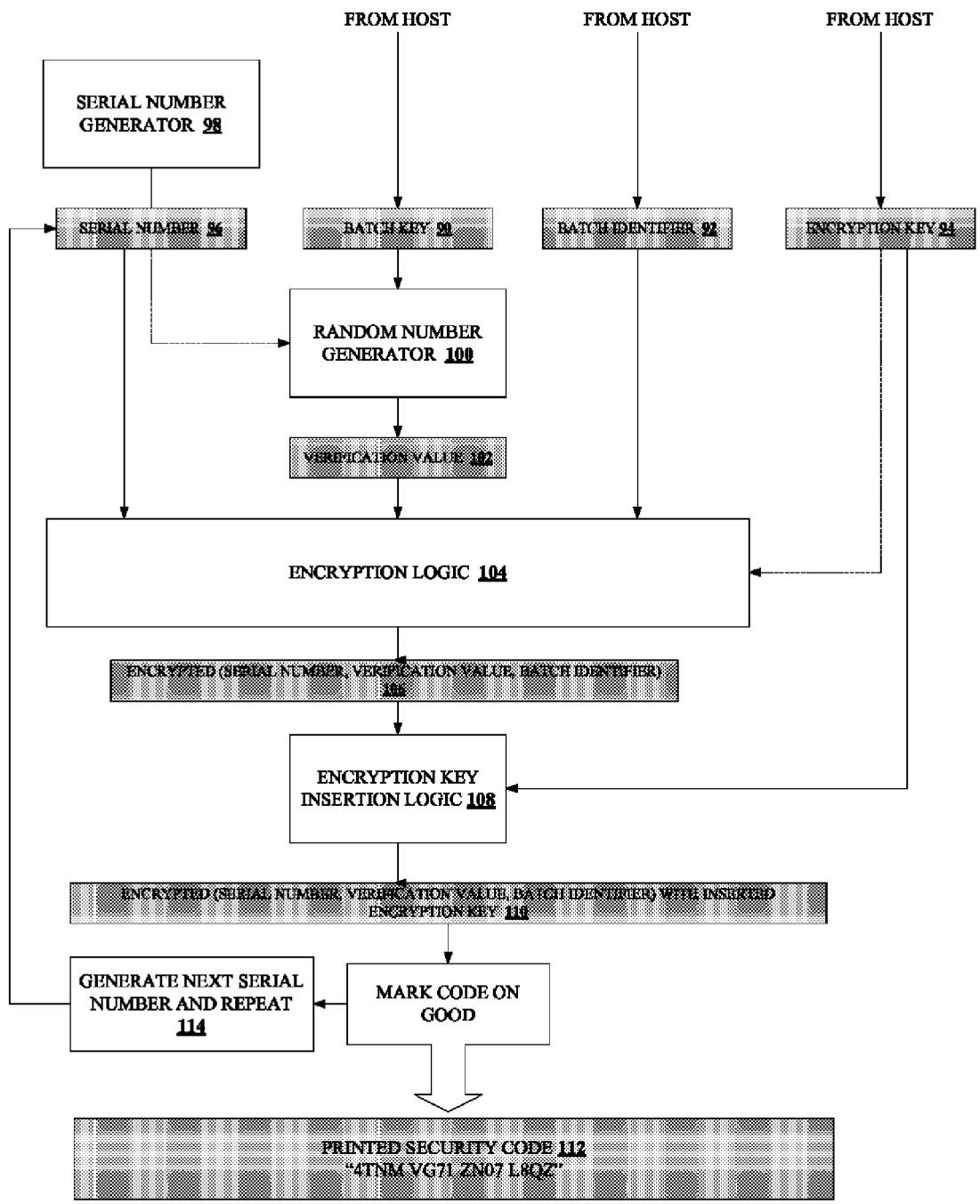
FIG. 4 illustrates operations and data flow associated with a method for generating security codes, according to an embodiment of the invention.

FIG. 4 illustrates the operations and data flow associated with a method for generating security codes, according to an embodiment of the invention. The operations illustrated in FIG. 4 serve as one example of the client-side operation 64 of method 50 illustrated in FIG. 2. Accordingly, after initiating a client request to generate security codes, the code generation logic 22 of the client 14 receives data from the host 12. In particular, the data received from the host 12 includes three portions: a batch ID 92, a batch key 90, and an optional encryption key 94. In addition to a serial number 96 generated by a serial number generator 98 that is part of the client's code generation logic 22, the three portions of data received from the host 12 are utilized to generate security codes.

The operation to generate a security code begins with a serial number 96, a batch ID 92 and a batch key 90 (which may also be known as a seed number). The serial number 96 is a unique identifier of the product within the batch identified by the batch ID 92. The serial number 96 may be generated by the client 14 in any way that assures the serial number is distinct from all previously-generated serial numbers in that batch, such as a simple numerical progression, a deterministic pseudo-random sequence, or a series of randomly generated values from which duplicates are removed.

A verification value 102 is produced by combining one or more of the batch ID 92 and serial number 96 with the batch key 90. The verification value can later be used to determine the authenticity of the resulting security code 112. In one embodiment of the invention shown in FIG. 4, the batch key 90 is used as the seed for a pseudo-random number generator 100 to generate a pseudo-random number that is used as the verification value 102. After the verification value 102 has been generated, the serial number 96, batch ID 92 and verification value 102 are optionally scrambled and/or encrypted by encryption logic 104. It will be appreciated by those skilled in the art that a wide variety of well-known encryption/decryption algorithms may be utilized. For example, in one embodiment of the invention, a simple transposition algorithm is utilized to encrypt the data.

In one embodiment of the invention, the encryption algorithm utilized by the encryption logic 104 to encrypt the data (e.g., the serial number 96, batch ID 92, and verification value 102) is associated with an encryption key 94. For example, in one embodiment of the invention, encryption logic 104 is capable of performing a wide variety of encryption algorithms. Accordingly, an encryption key 94 received from the host 12, instructs or directs the encryption logic 104 to use a particular encryption algorithm to encrypt the serial number 96, batch ID 92, and verification value 102. Consequently, during an authentication operation, the host 12, which originally selects and assigns the encryption key 94, will be able to decrypt the encrypted data 106 to realize the serial number 96, batch ID 92, and verification value 102. In one embodiment of the invention, the encryption key 94 may be generated and assigned at the time the host 12 communicates the batch ID 92 and batch key 90 to the client. Alternatively, the encryption key 94 may be assigned prior to the request to generate security codes. For example, in one embodiment of the invention, an encryption key 94 may be assigned on a per-client 14 basis, such that each client has its own encryption key 94 that is known by the host 12.

After the serial number 96, batch ID 92, and verification value 102 have been encrypted to form the encrypted data 106, optional encryption key insertion logic 108 may insert all or a portion of the encryption key 94 into the encrypted data 106 to complete the generation of the security code 110. For example, the encryption key 94 may be inserted into the encrypted data 106 at a known position. Consequently, during an authentication operation, the code authentication logic 38 of the host 12 can extract the encryption key 94 from the known position in the security code.

Once the encryption key 94 has been inserted into the encrypted data 106, the security code 110 is ready to be printed on a product, label or product packaging. In one embodiment of the invention, the resulting security code may be a sequence of sixteen alphanumeric characters. For example, in FIG. 4, the security code 110 is shown as a string of sixteen alphanumeric characters 112. Alternatively, in one embodiment of the invention, the alphanumeric characters may be encoded into a graphic symbol, such as the datamatrix illustrated in FIG. 6B. In either case, after the security code is generated by the code generation logic 22, the code marking module 24 controls and manages the transfer of the security code to the printing device 26, and the actual printing of the security code onto the product, label, or product packaging.

Referring again to FIG. 4, after a first security code has been generated, the code generation operation continues by generating the next serial number 114 for the batch. To generate the second security code, which corresponds to the second serial number, a second verification value is produced by combining the second serial number and/or the batch ID with the batch key. In one embodiment of the invention, the random number generator 100 is run, iteratively, a number of times equal to the serial number. That is, the pseudo-random number generated during the first pass is used as an input (e.g., a seed) into the pseudo-random number generator 100 for the second pass. Accordingly, the pseudo-random number generator 100 is run twice to generate the verification value for the second security code, which is associated with the second serial number, and three times for the third security code, which is associated with the third serial number, and so on, until all of the security codes have been generated. When the quantity of generated serial numbers, and corresponding security codes, is equal to the number of security codes originally requested by the client, the code generation operation is complete.

Figure 5:
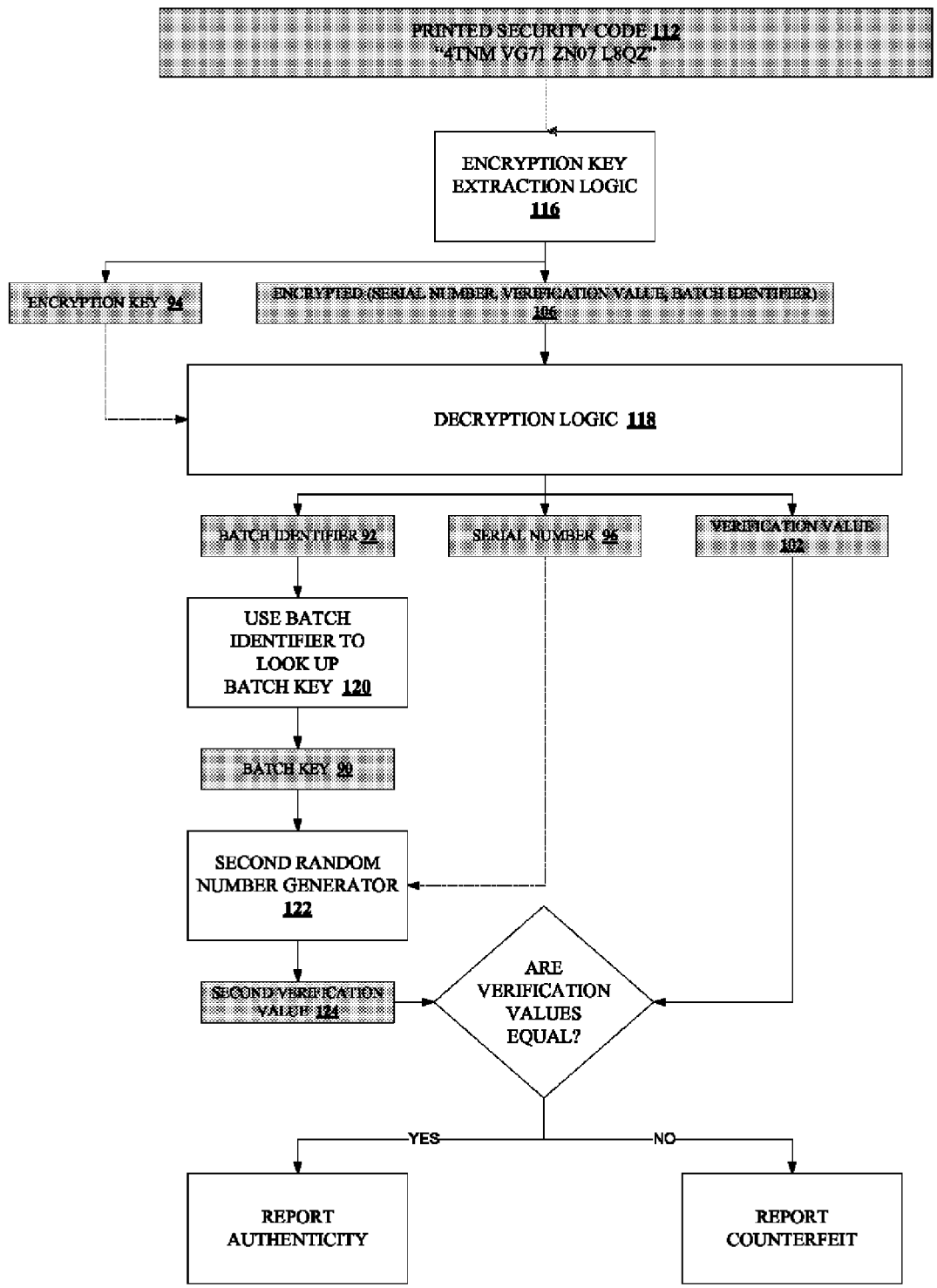
FIG. 5 illustrates operations and data flow associated with a method for authenticating a product containing a security code, according to an embodiment of the invention.

FIG. 5 illustrates the operations and data flow associated with a method for authenticating a product containing a security code, according to an embodiment of the invention. The operations illustrated in FIG. 5 serve as one example of the host-side operation 78 of method 70 illustrated in FIG. 3.

As illustrated in FIG. 5, the authentication operation begins with a printed security code 112. For example, in FIG. 5 the security code is a combination of 16 characters and numbers. First, optional encryption key extraction logic 116 extracts the encryption key 94 from the security code 112. Because the code generation logic 22 inserted the encryption key 94 into the security code in a known position, the code authentication logic 38 has knowledge of the position of the encryption key 94 within the security code 112. As a result of extracting the encryption key 94, the security code is reduced to encrypted data 106 (e.g., serial number 96, batch ID 92, and verification value 102).

After the encryption key 94 has been extracted, the encryption key 94 is utilized as an input to decryption logic 118 to decrypt the encrypted data 106 into its component parts, for example, the serial number 96, batch ID 92, and verification value 102. Next, the batch identifier 92 is utilized in a look-up operation 120 to determine the batch key 90 that was utilized to generate the verification value 102. A copy of the batch key 90, which is initially generated at the host 12 in response to the client's request to generate security codes, is stored at the host 12 along with the batch ID 92 and any product data received from the client 14 as part of the initial request to generate security codes. Consequently, once the batch ID 92 is determined, the code authentication logic 38 can look-up the batch key 90, as well as any product data that is associated with the batch ID 92.

Finally, the host 12 uses the same method as the client 14 did to produce a second verification value 124 by combining the serial number 96 and/or the batch ID 92 with the batch key 90. In one embodiment of the invention, after the batch ID 92 is used to look-up the batch key 90, the batch key 90 is used as a seed for a second pseudo-random number generator 122, which utilizes the same logic as the pseudo-random number generator 100 of the client 12. The second pseudo-random number generator 122 is then run, iteratively, a number of times equal to the serial number 96, such that each pass uses the result (e.g., the resulting pseudo-random number) of the previous pass as a seed. The resulting pseudo-random number is used as the second verification value 124, which is then compared with the first verification value 102 decrypted by the decryption logic 118. If the verification values 102 and 124 are identical, then the host 12 reports that the security code 112 is authentic. However, if the verification values 102 and 124 are not identical, the host 12 reports that the security code 112 is not authentic.

In one embodiment of the invention, product data associated with a batch ID may be communicated to a consumer, or other person in the distribution chain of a product, in response to that person submitting a code authentication request to the host. For example, in one embodiment of the invention, the product data that is communicated to the consumer may indicate the assigned destination (e.g., geographical location or retail store) for a given product. That is, the product data may indicate the final destination in the distribution chain for that particular product. Accordingly, the consumer can determine whether a product has been diverted from its originally assigned destination. In another embodiment of the invention, product data communicated to the consumer may include data associated with a manufacturing date, a "use-by" or a "sell-by" date. Accordingly, the consumer can determine if someone in the distribution chain of the product has tampered with the product packaging by changing a date associated with the product. In general, by providing product data during a code authentication request, several aspects related to a product can be authenticated.

FIG.'s. 6A and 6B illustrate examples of security codes, according to an embodiment of the invention. In one embodiment of the invention, the security code may be a string of sixteen alphanumeric characters consisting of numbers and letters, such as the security code 130 shown in FIG. 6A. By utilizing different combinations of sixteen alphanumeric characters, more than a million, billion, billion ($10^{24}$) unique security codes may be generated. However, it will be appreciated by one skilled in the art that alternative embodiments of the invention may use a security code that is more or less than sixteen characters in length, and may use a security code that makes use of the entire set of ASCII characters.

Figures 6A, 6B:
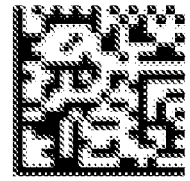
FIG. 6A illustrates an example of a security code comprising alphanumeric text, according to an embodiment of the invention.
FIG. 6B illustrates an example of a security code comprising alphanumeric text encoded as a graphic symbol, according to an embodiment of the invention.

FIG. 6B illustrates a security code 132 represented as a graphic symbol. In particular, the security code 132 shown in FIG. 6B is a special machine readable graphic symbol known as a datamatrix. A datamatrix is a two-dimensional matrix barcode consisting of black and white square modules arranged in either a square or rectangular pattern. Similar to a traditional barcode, a datamatrix can be read by a machine, such as a matrix barcode reader. Encoding an alphanumeric representation of the security code in a graphic symbol, such as the datamatrix 132 of FIG. 6B, provides several advantages. First, error correction and redundancy are built-in to the datamatrix 132. Consequently, a security code represented as a datamatrix can still be read if it becomes partially damaged. Another advantage is the small footprint, or size, of the datamatrix. A datamatrix can encode as many as 50 characters in a three by three millimeter square, which can be discretely positioned on a product, a label, or product packaging. Finally, the datamatrix can be quickly and easily read by a machine. Of course, it will be appreciated by those skilled in the art that in various alternative embodiments, security codes may be encoded with other graphic symbologies, for example, such as barcode fonts consistent with the PDF417 or QR Code standards.

In one embodiment of the invention, both versions of the security code 130 and 132 may be included on the product, label, or product packaging. For example, the alphanumeric representation of the security code 130 and the graphic symbol representation 132 may appear together on the product, label or product packaging. This provides a wide range of possible methods and mechanisms for reading and communicating the security code to the host 12 for authentication.

In one embodiment of the invention, when extra security is required, the security codes may be applied or printed to the product, label, or product packaging in a covert manner, such that a consumer is not aware of the existence of the security code. For example, the security codes may be applied to the products, labels or product packaging with a special invisible ink or other chemical-based application making the security code invisible to a consumer. According to the type of invisible ink or chemical used to apply the security code, reading the security code may require the application of heat, ultraviolet light, or a chemical. This approach may be utilized when someone in the supply or distribution chain other than the consumer is likely to be authenticating the product. For example, a covert security code may be provided for the purpose of authenticating products by customs officials.

Figure 7:
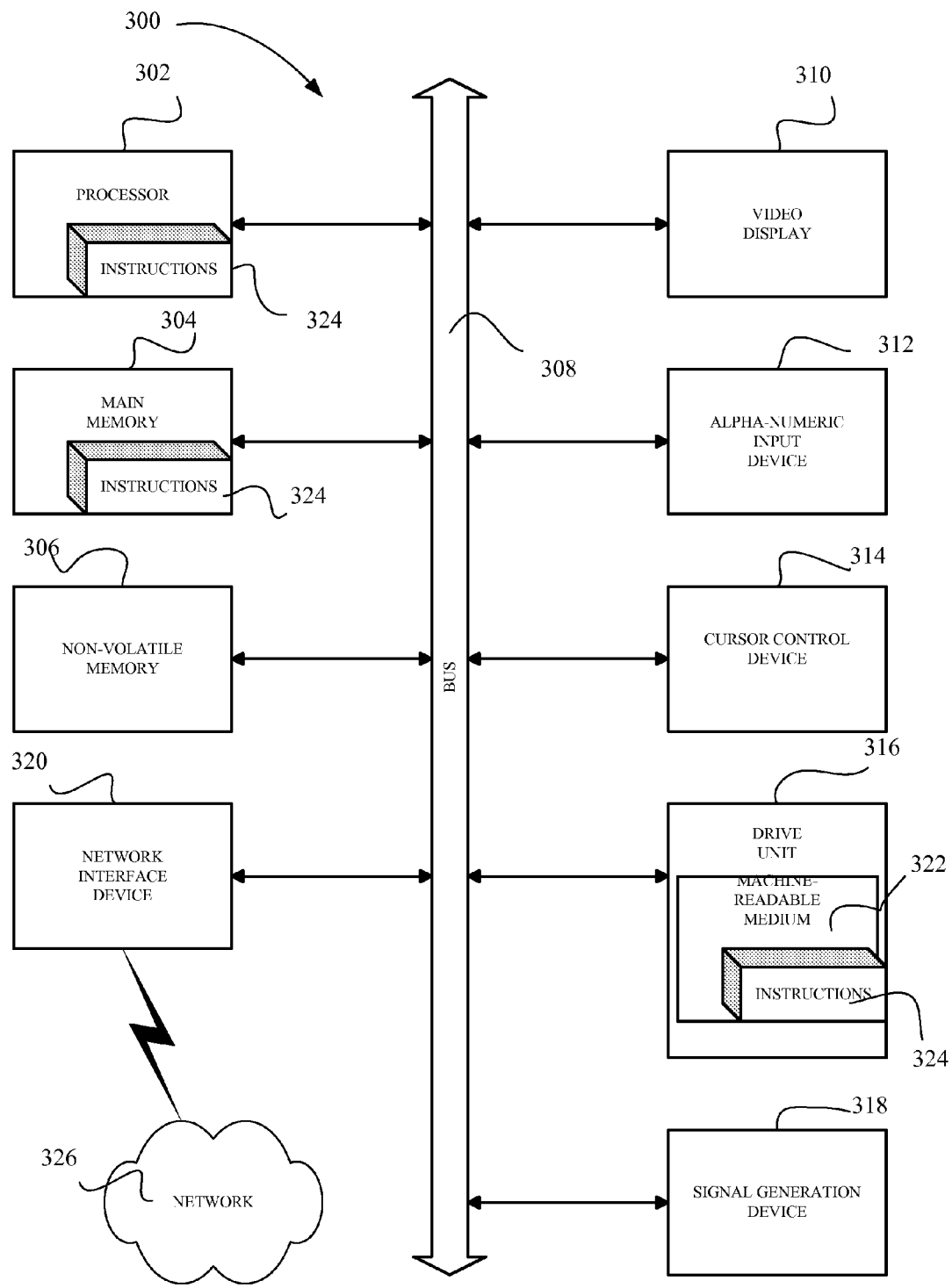
FIG. 7 illustrates a diagrammatic representation of a machine, in the exemplary form of a computer system, within which a set of instructions for causing the machine to perform any one or more of the methodologies discussed herein, may be executed.

FIG. 7 shows a diagrammatic representation of a machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server (e.g., host 12) or a client 14 machine in a client-server network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a nonvolatile memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media. The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for deterring counterfeits have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
   code generation logic to generate a plurality of security codes to be printed on a plurality of products without retaining the plurality of security codes after the security codes are printed on the plurality of products; and
   code authentication logic to receive a code authentication request that includes a security code that has been printed on a particular product and to authenticate the security code by determining whether the security code was generated by the code generation logic.

2. The system of claim 1, wherein the code generation logic is to provide a verification value and to include the verification value in a security code, and the code authentication logic is to authenticate the security code by comparing the verification value included in the security code with a value provided by the system.

3. The system of claim 2, wherein the code generation logic is to encrypt the security code after the verification value has been included in the security code, and the code authentication logic is to decrypt the security code prior to comparing the verification value with the value provided by the system.

4. The system of claim 1, wherein the code generation logic is to generate the security codes in response to the system receiving a request from a separate system that includes a quantity of security codes to be generated.

5. The system of claim 1, wherein the code generation logic is to further receive product data associated with the plurality of products on which the security codes are to be printed; and in response to the code authentication request, providing the product data associated with the plurality of products and a response to the authentication request.

6. The system of claim 1, wherein the system is to communicate with a plurality of separate systems in different geographical locations, and the code authentication logic is to authenticate security codes generated by any one of the plurality of separate systems.

* * * * *

UNITED STATES PATENT AND TRADEMARK OFFICE
CERTIFICATE OF CORRECTION

| | | |
|---|---|---|
| PATENT NO. | : 7,992,772 B2 | Page 1 of 1 |
| APPLICATION NO. | : 11/612191 | |
| DATED | : August 9, 2011 | |
| INVENTOR(S) | : Elliott Grant et al. | |

It is certified that error appears in the above-identified patent and that said Letters Patent is hereby corrected as shown below:

Please correct as follows:

Patent Cover Page

(75) Inventors: "Elliot" should be changed to --Elliott--

Signed and Sealed this
First Day of May, 2012

David J. Kappos
*Director of the United States Patent and Trademark Office*